(No Model.)

E. D. NEWTON.
PORTABLE APPARATUS FOR HEATING MINERAL WATER IN BOTTLES OR FLASKS.

No. 299,251. Patented May 27, 1884.

WITNESSES:
Gustave Dietrich
Fred Huetwohl

INVENTOR
Edwin D. Newton

UNITED STATES PATENT OFFICE.

EDWIN D. NEWTON, OF NEW YORK, N. Y.

PORTABLE APPARATUS FOR HEATING MINERAL WATER IN BOTTLES OR FLASKS.

SPECIFICATION forming part of Letters Patent No. 299,251, dated May 27, 1884.

Application filed June 25, 1883. (No model.)

*To all whom it may concern:*

Be it known that I, EDWIN D. NEWTON, a citizen of the United States, residing at New York, in the county of New York and State of New York, have invented a new and Improved Portable Apparatus for Heating Mineral Water in Bottles or Flasks, of which the following is a full, clear, and exact description, reference being had to the accompanying drawings and letters of reference marked thereon, in which—

Figure 1:
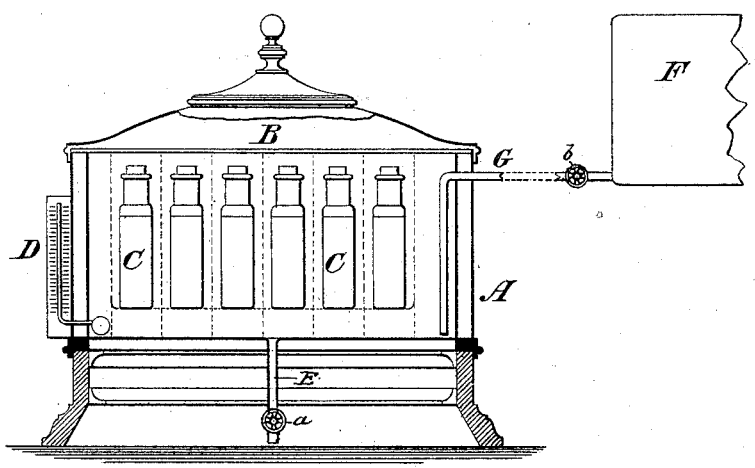
Figure 2:
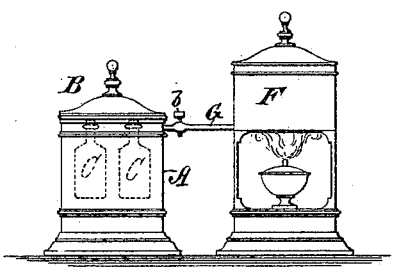

Figure 1 is a longitudinal sectional elevation of my improved portable apparatus for heating mineral water in bottles or flasks, and Fig. 2 is a longitudinal elevation of an apparatus on a smaller scale.

The object of my invention is to provide a new and improved portable apparatus for heating mineral water in bottles or flasks; and it consists in the peculiar construction and arrangement of the parts of the apparatus, as hereinafter more fully set forth, and pointed out in the claim.

In the drawings, A represents a portable vessel, supported on legs, and provided with double walls, the space between which can remain empty, or can be filled with a suitable non-conducting material. The vessel A is provided with a tightly-fitting cover, and with an outlet-pipe, E, in its bottom, provided with a stop-cock, a.

D represents a thermometer secured to one side of the vessel A, the bulb of said thermometer being arranged within the vessel A, near or at its bottom.

F represents a hot-water-supply vessel, the bottom of which is arranged nearly as high as the top of the vessel A. The vessel F is provided with a suitable support, whereby it can be heated by a lamp, burner, or other suitable means placed under it.

G represents an angular pipe, provided with a stop-cock, b, and extending from near the bottom of the hot-water-supply vessel F through the walls of the vessel A, near its top, and thence extends downward to near the bottom of the vessel A, so as to deliver the hot water below the bottoms of the bottles or flasks C, containing the mineral water to be heated, and arranged in racks secured to the interior of the vessel A.

In practice, the bottles or flasks, having been filled with the mineral water to be heated, are arranged in the racks. Any water contained in the vessel A is drawn off through the stop-cock a in the pipe E, which is then closed by the stop-cock a. The stop-cock b in the angular pipe G is turned, and the hot water flows through the pipe G into the bottom of the vessel A, below the bottoms of the bottles C, which are thus heated from their bottoms. The heating-water in vessel A should always be kept below its boiling-point. Hot water at its boiling-point, however, in flowing from vessel F through the pipe G into the vessel A, will lose a portion of its heat by radiation from said pipe, and on entering vessel A will be below the boiling-point.

By means of the thermometer the temperature of the water in the vessel A can readily be ascertained and regulated, and the heating-water easily kept at any desired temperature by discharging the cool water through pipe E.

I am aware that in an apparatus constructed for that purpose water has heretofore been maintained hot by passing it through a heater, causing the circulation of the water, and I therefore lay no claim to such invention, broadly, my invention being confined to my peculiar construction of portable apparatus for heating mineral water in bottles or flasks by means of a lamp or burner, or other similar means.

Having thus fully described my invention, what I claim as new, and desire to secure by Letters Patent, is—

A portable apparatus for heating mineral water in bottles or flasks to a certain temperature, consisting of the elevated hot-water vessel F, having suitable heating means, the receiving-tank A, having non-conducting walls, a valved discharge-pipe leading from the bottom, a tight cover, and an attached thermometer, and the valved pipe G, connecting the hot-water vessel and the receiving-tank, the whole arranged to permit the maintenance at the desired temperature of the water in the receiving-tank by the proper manipulation of the hot-water supply and cold-water-discharge valves, substantially as specified.

EDWIN D. NEWTON.

Witnesses:
JOHN H. HUGHES,
DAVID HART.